US011927920B2

(12) United States Patent
Schenk

(10) Patent No.: US 11,927,920 B2
(45) Date of Patent: Mar. 12, 2024

(54) ERGONOMIC MULTI-COMPARTMENT CASE

(71) Applicant: IMERIUM Sàrl, St-Imier (CH)

(72) Inventor: Bernard Schenk, Saint-Imier (CH)

(73) Assignee: IMERIUM SÀRL, St-Imier (CH)

( * ) Notice: Subject to any disclaimer, the term of this patent is extended or adjusted under 35 U.S.C. 154(b) by 915 days.

(21) Appl. No.: 16/763,748

(22) PCT Filed: Nov. 2, 2018

(86) PCT No.: PCT/EP2018/080060
§ 371 (c)(1),
(2) Date: May 13, 2020

(87) PCT Pub. No.: WO2019/101495
PCT Pub. Date: May 31, 2019

(65) Prior Publication Data

US 2020/0371478 A1 Nov. 26, 2020

(30) Foreign Application Priority Data

Nov. 27, 2017 (CH) .................................... 01438/17

(51) Int. Cl.
*G04B 37/00* (2006.01)
*G04B 37/14* (2006.01)
*G04G 17/08* (2006.01)

(52) U.S. Cl.
CPC ..... *G04B 37/0058* (2013.01); *G04B 37/1486* (2013.01); *G04G 17/08* (2013.01)

(58) Field of Classification Search
CPC ............ G04B 37/0058; G04B 37/1486; G04B 37/0033; G04G 17/08; G04G 17/083
See application file for complete search history.

(56) References Cited

U.S. PATENT DOCUMENTS 3,864,856 A 2/1975 McManus
4,412,751 A * 11/1983 Jeannet ................ G04B 37/086 368/204

(Continued)

FOREIGN PATENT DOCUMENTS

CN 206079318 U 4/2017
DE 297 08 273 U1 8/1997

(Continued)

OTHER PUBLICATIONS

International Search Report, PCT/EP2018/080060, dated Feb. 28, 2019.

*Primary Examiner* — Edwin A. Leon
*Assistant Examiner* — Kevin Andrew Johnston
(74) *Attorney, Agent, or Firm* — NIXON & VANDERHYE

(57) ABSTRACT

Disclosed is a case including a first compartment capable of accommodating a first device, possibly associated with a first display, the first compartment being delimited by at least a first wall delimiting a first opening and a first bottom integral with or capable of being fixed to the first wall. The case includes a second compartment which is removable with respect to the first compartment and which is delimited by at least one second wall and a second bottom which is integral with or capable of being fixed to the second wall and which extends along or parallel to a plane forming an obtuse angle with an extension plane of the first wall and/or the first bottom.

20 Claims, 2 Drawing Sheets

(56) References Cited

U.S. PATENT DOCUMENTS

| | | | | |
|---|---|---|---|---|
| 4,419,770 | A * | 12/1983 | Yagi | G04R 60/04 455/344 |
| 2009/0196124 | A1 * | 8/2009 | Mooring | G04B 37/005 368/204 |
| 2011/0044138 | A1 * | 2/2011 | Danthe | G04B 19/065 368/69 |
| 2015/0115870 | A1 | 4/2015 | Vance | |
| 2016/0026156 | A1 * | 1/2016 | Jackson | G06F 3/04817 368/14 |
| 2017/0208160 | A1 * | 7/2017 | Kim | H02J 7/02 |

FOREIGN PATENT DOCUMENTS

| | | | |
|---|---|---|---|
| EP | 0 189 372 | | 7/1986 |
| JP | 2000-259577 | A | 9/2000 |
| WO | 90/12347 | A1 | 10/1990 |
| WO | WO 2013/153275 | | 10/2013 |

* cited by examiner

ERGONOMIC MULTI-COMPARTMENT CASE

TECHNICAL FIELD

The present invention relates to the field of portable accessories, in particular so-called "connected" watches and bracelets, i.e. equipped with electronic circuits capable of sending/receiving data via a wireless telecommunication network to external electronic devices equipped with complementary means of communication. It concerns, more particularly, a compound case with multiple compartments to accommodate different mechanisms and functionalities, whether complementary or not, the case being shaped to present an ergonomic capability for a wearing without sliding or rotating around a user's wrist.

STATE OF THE ART

For several years now, there has been a boom in so-called "connected" devices with functionalities for data communication via wireless communications networks, whether mobile telecommunications networks (4G and 5G in particular), or wireless data communications networks based on communication protocols governed by the standards of the IEEE 802.11 group (WiFi protocols) or Bluetooth. These "connected" devices, associated with sensors and other suitable electronic beacons, make it possible in particular to monitor in real time various physiological parameters, the position of their wearer and to record these data and/or transmit them automatically or on request via a said wireless communication network to an additional receiving device (mobile phone, data server, computer, etc.).

These "connected" devices commonly take in particular the form of bracelets or wristwatches, which are then commonly referred to as "connected watches".

One of the main drawbacks of these devices is their large size and low autonomy. The more functions there are, the more the relative arrangement of the different sensors and the electronic structure underlying their operation is also complex and energy-intensive, requiring large batteries to ensure normal operation over a period of at least 24 hours.

However, this large footprint is detrimental to the ergonomic capability of these devices and their design. Indeed, the integration of many functions, most often in connected watches, implies the use of a single wide and thick case, potentially uncomfortable and unstable to wear on a user's wrist depending on the dimensions thereof. This can be uncomfortable to use, as in the use of classic watches.

Indeed, while folding the forearm and simultaneously turning the wrist are movements carried out instinctively by the wearer of a wristwatch, the movement of rotating the wrist is not always easy or even possible. This is often the case when the hand of the limb wearing the watch (or the bracelet) is busy holding a tool or the steering wheel of a car, for example, or conversely during important movements of the limb, such as during sports activities (e.g. racing, sailing, horse riding). In some cases, the watch display may not be correctly visible to the wearer because the watch rotates around the wrist and/or slides around the wrist.

The simultaneous or consecutive display of several functions may also require the user to operate the connected device with a free hand, which is of course impractical or even dangerous when driving, for example.

To overcome this disadvantage, connected devices and wrist watches have been proposed in the prior art, e.g. in WO 2013/153275 A1 or US 2015/0115870, having several independent sections that are hinged and electrically connected to each other. However, these devices do not provide adequate ergonomic capability in that they do not properly conform to the wearer's geometry, nor do they provide the wearer with the opportunity to choose and adapt the choice and number of functions he or she wants at any given time or period.

Finally, there is currently no watch case that allows the basic functions of the watch to be supplemented by another function independent of the main mechanism, in particular an secondary storage or sensory function. An object of the present invention is therefore to provide a case for any device intended to be worn on the wrist by a user, which allows ergonomic and stable wearing of said device and makes it possible to permanently associate at least two distinct functionalities, possibly not functionally dependent on each other.

Another object of the invention is to provide a case providing a great versatility of possible uses, providing users of the device incorporating this case with flexibility and a choice of multiple function combinations where applicable.

Another object of the invention is to enable the design of a uniquely aesthetic and durable case that hosts multiple functionalities, regardless of the lifespan or particular aesthetics of each of these functionalities.

DISCLOSURE OF THE INVENTION

According to a first aspect, the invention relates to a case as defined in the claims.

More particularly, the case of the invention comprises a first compartment delimiting a first volume capable of accommodating a first device, said first compartment being delimited by at least one wall peripheral to a first opening in said case. This case is characterized in that it comprises a second compartment delimiting a second volume, said second compartment being capable of being removably fixed to a mounting plate of said case extending along or parallel to a plane P2 forming an obtuse angle $\beta$ with a median extension plane P1 of the first compartment.

The present invention aims at creating a case whose thickness does not exceed that of conventional wristwatch cases, in which in particular a standard mechanical or electronic conventional movement and its associated display can be mounted in the usual way in the first compartment and which at the same time provides a second compartment that can accommodate any desired functionality: storage, power supply battery, second electronic mechanism (access control badge, physiological data monitoring, GPS . . . ), and where applicable to adapt this second functionality according to the needs depending on the moment.

The case of the invention furthermore allows, by the relative angular positioning of the two compartments, to provide a "natural" ergonomic positioning of the case on the wrist of a user and a wedging of the latter capable of preventing any rotation of the case. Moreover, this wedging provided by the respective orientation of the compartments allows advantageously, when the first compartment receives a mechanism associated with a display, to show said display in the most favourable position around the wrist to allow the reading of the latter by simply bending the forearm, this position being perfectly stabilized.

In the case of the invention, each compartment forms a host of a specific functionality, and where appropriate complementary to each other, as in the case of an electronic watch and a power supply battery for example. The positioning of each functionality in the different compartments does not matter and can be chosen by the wearer according to his needs.

Each compartment accommodates a wide range of functions. A non-limited example would be:

Timepiece
Pill box
Remote control
Wireless identification tag or access badge
Electric battery
Ornament, which are jewellery or not
Computer memory
Etc.

Such a case, composed as the one proposed by the invention, thus makes it possible to easily increase the volume of nesting of classical horological devices and/or of complementary or individual “connected” devices to offer the wearers a maximum number of functionalities and a maximum legibility. It also allows, depending on the case, to offer multiple aesthetic and functional possibilities by varying the colours and materials of the compartments and their displays, or possible covers. Covers and compartments may also provide an electromagnetic shielding function where appropriate, which may or may not be activated depending on the position of a said compartment and/or its cover.

The case of the invention also provides an opportunity for a wearer to combine functional devices from different suppliers into a single personal item worn on the wrist, thus offering greater flexibility of use.

Particular features of the case which is the subject of this invention shall be the subject of the dependent claims.

According to a preferred embodiment, the angle β is between 100° and 150° with respect to the extension plane P1.

According to a preferred embodiment, the plate has an opening of a shape complementary to at least part of the second compartment, said opening and said plate forming a seat for wedging the second compartment with respect to the first compartment. The second compartment may also be fixed to an upper face or a lower face of the plate, in a way so as to be accessible and visible to the wearer in the first case or, conversely, to be hidden in contact with the wearer’s wrist when the case is worn.

According to a preferred embodiment, said second compartment delimits an opening closed by a cover. Where applicable, this cover can be transparent or not, form an electromagnetic barrier or not.

In addition, in an advantageous embodiment, said cover is mounted pivotally or slidably on a wall of the second compartment or on the mounting plate of said second compartment.

Advantageously, the case of the invention comprises means for fixing bracelet strands, for example in the form of horns arranged on the walls of the compartments and/or the mounting plate of the second compartment.

Preferably, the second compartment is removable from said plate by means of reversible fixing means. These reversible fixing means can be chosen from: snap-fastening means, means for embedding by elastic deformation, screwing means.

In another advantageous embodiment, the first and second compartments and, where appropriate, said plate, comprise complementary electrical contacts arranged such that an electrical contact is established between said compartments and the devices they contain when said second compartment is mounted on the plate.

BRIEF DESCRIPTION OF THE DRAWINGS

The details of the invention will become clearer on reading the following description, with reference to the attached drawings in which.

EMBODIMENT OF THE INVENTION

Figure 1:
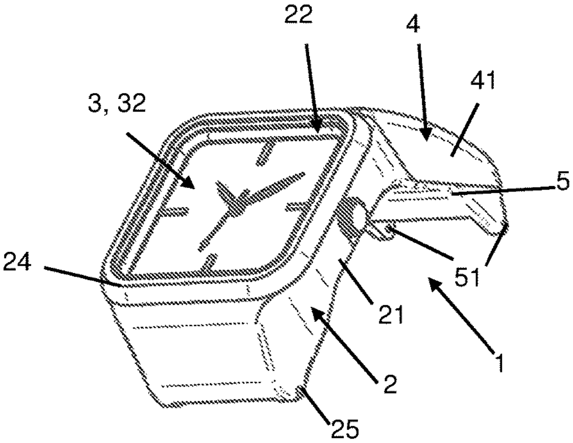
FIGS. 1 to 3B represent different views of a case according to the invention in a first embodiment.

The present invention concerns a case for wrist-worn portable devices such as wristwatches, watches and connected bracelets in particular.

A first embodiment of this case is shown in FIGS. 1 to 3B. The case 1 of the invention consists of a composition of a plurality of distinct compartments 2, 4 each intended to accommodate a particular functionality, technically complementary or not, each said functionality being accessible to the user independently of the other and at least one of the functionalities being flexible by removal from case 1 as will be described hereafter.

In the example shown, case 1 comprises a first compartment 2 capable of accommodating a device 3, in the example shown, without limitation, a horological device equipped with a mechanical or electronic movement, whose display 32 (dial, hands) is visible through an upper opening 22 of compartment 2.

Said first compartment 2 defines a first volume of a first receptacle delimited by at least a first wall or 21 delimiting said opening 22, which is a through opening, and a first bottom 23 integral with or capable of being attached to said first wall 21 to make said opening 22 blind. In this example, a bezel 24 is mounted on the wall 21 on an upper side of the latter opposite the back 23 in order to maintain a glass for protecting display 32 of the watch device 3, in a manner that is well known and classic per se in watchmaking.

The bottom 23 can be conventionally manufactured as a part integral with wall 21 or can be added and fixed to it by any suitable means (in particular by screwing). Such a bottom may also be optional if device 3 is not a horological device or other active device as shown here.

In accordance with the invention, case 1 also comprises a second compartment 4 delimiting a second volume and being advantageously mounted in a removable manner on a mounting plate 5 which is integral, without discontinuities, with wall 21 or bottom 23 of the first compartment 2. The mounting plate 5 of said case extends along or parallel to a plane P2 forming an obtuse angle β with a median extension plane P1 of the first compartment 2. The second compartment 4 is formed by at least a second wall 41 and, where appropriate, a second bottom 42 which is integral with, by manufacture, or capable of being attached to said second wall 41. This second compartment 4 is dedicated to accommodate any device capable of fulfilling a second function for the benefit of the wearer of case 1, preferably distinct, where appropriate functionally complementary, from that of the first device 3 housed in the first compartment 2 of case 1.

Figure 2:
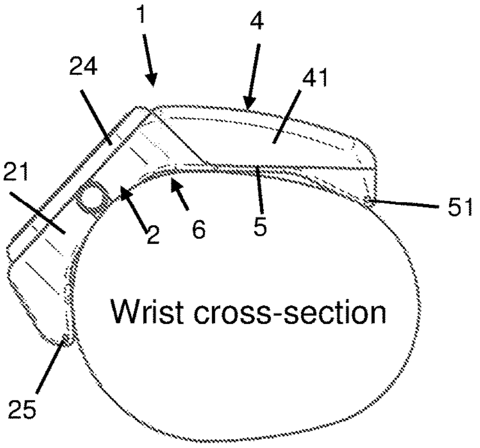

The angular orientation of the second compartment 4 with respect to the first compartment 2 of case 1 is intended to provide a good ergonomic capability to case 1 of the invention when being worn on the wrist of a user. Thus, as can be seen in FIG. 2, the extension of the second compartment 4 along plane P2 gives case 1 an ergonomic wedging configuration on a wearer’s wrist, the second compartment 4 resting on the upper face of the wrist while the first compartment 2 and its device 3 covers a lateral rounded part of the wrist normally corresponding to the wearer's radius.

It should be noted that the second compartment 4 can be assembled on an upper surface of the plate as shown in the figures and accessible to the user on the top of his wrist, or a lower surface of plate 5 in contact with the wrist. In the first case, the second compartment 4 is a visible design element of the case and its aesthetic appearance should preferably be adapted to that of the entire case 1. In the second case, the second compartment may be completely hidden and inaccessible under normal wearing conditions by a user. The choice of positioning of the second compartment 4 may of course depend in particular on the functionality for which it is the host and the need for direct physical access to this functionality where appropriate.

The case 1 of the invention thus essentially comprises three sections: a first section formed by the first compartment 2, intended to cover a curved part of the wrist, a second section formed by the plate 5 and the second compartment 4, which is intended to extend over the major part of the upper face of the wrist, and an intermediate connecting section 6 between the wall 21 of the first compartment 2 and the plate 5, this connecting section 6 defining the relative angulation with the angle β of the first two. These three sections naturally form a single rigid body, which can be made of various materials such as metals, especially steel, gold, platinum, or synthetic or natural plastics, especially rubber-based.

The length of the first compartment can be approximately equal to that of the second compartment to ensure that the case 1 is balanced around the connection section 6. However, this is by no means obligatory and the respective dimensions of the compartments of case 1 may vary essentially according to the devices or functionalities they must accommodate, provided that the particular angular orientation of the compartments is respected. Indeed, this orientation advantageously gives the case 1 thus configured a shape adapted to fit naturally to the curve of the wrist of the wearer of case 1, which provides an optimal wedging which opposes the rotation by sliding of the latter insofar as the wrist is not cylindrical. This wedging effect can in addition be advantageously reinforced by the use of horns 25, 51 on the first wall 21 of the first compartment 2 and wall 41 of the second compartment 4, providing a final bend at the free ends of case 1 allowing the attachment of bracelet strands, in a manner that is classic per se.

The angle β between plane P2 and plane P1 containing the bottom 23 of the first compartment 2 is preferably between 100° and 150° in order to offer good adaptability of case 1 to various wrist shapes and sizes.

Preferably, the mounting plate 5 further has an opening 52 of complementary shape to at least part of the second compartment 4, in particular to the wall 41 and/or the bottom 42 of said second compartment 4. Said opening 52 may be of any suitable geometric shape, preferably regular, such as rectangular, circular or triangular for example. This opening 52 is advantageously provided in order to constitute with said plate 5 as a whole a seat for wedging the second compartment 4 with respect to the first compartment 2 or simply a recess for the second compartment 4, in particular when the latter is placed against the wearer's wrist in order to provide optimal comfort.

Figure 3A:
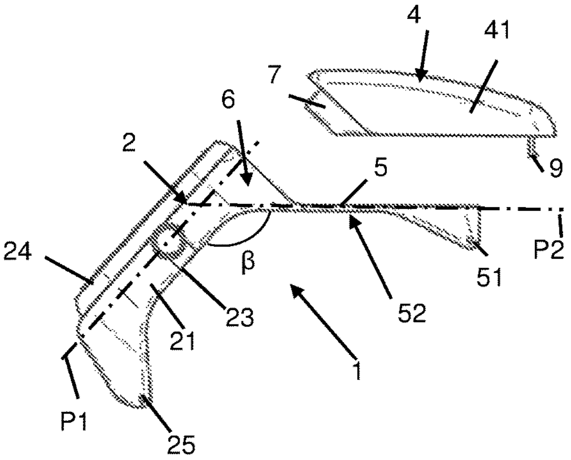
Figure 3B:
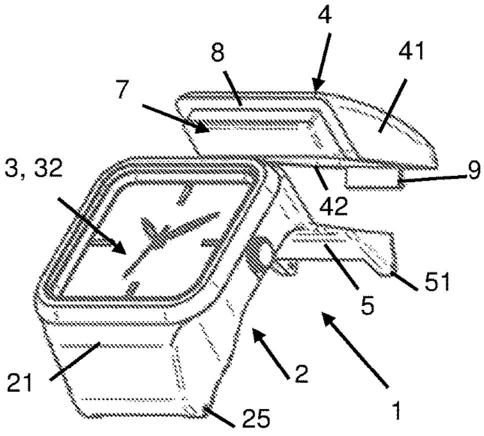
Figure 4A:
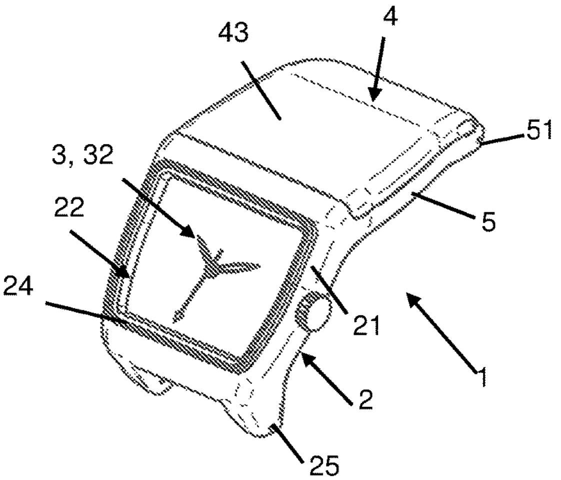
FIGS. 4A to 5B represent different views of a case according to the invention in a second embodiment.
Figure 4B:
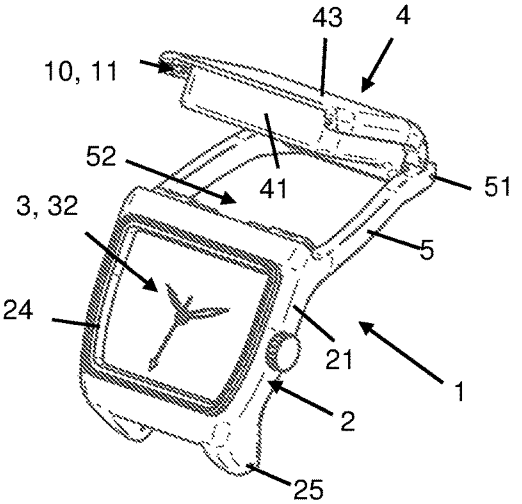
Figure 5A:
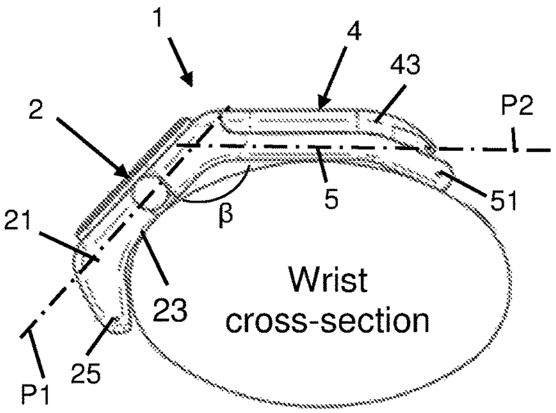
Figure 5B:
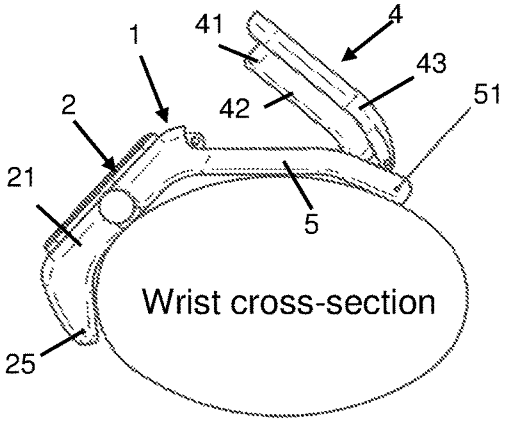

As can be seen in FIGS. 3A and 3B in particular, the second compartment 4 is removable from the mounting plate 5 by means of reversible fixing means 7, 8, which may include, for example, snap-fastening means by elastic deformation or means for embedding by elastic deformation or screwing means.

In the example shown, the reversible fixing means of the second compartment 4 comprise on the one hand a male embedding shape 7 delimited in wall 41 of the second compartment by a shoulder 8, said embedding shape 7 being complementary to a complementary female embedding shape (not visible in the figures) in the wall 21 of the first compartment 2, and on the other hand a deformable latch 9, capable of being inserted into the opening 52 of the plate 5 to lock the second compartment 4 on the edge delimited by the opening 52.

The second compartment 4 can host an electronic device such as a battery for supplying device 3 received in the first compartment. In this case, the first and second compartments 2, 4 then comprise on their respective walls 21, 41 and on the plate 5 when appropriate, complementary electrical contacts arranged in such a way that said electrical contacts are affixed to each other when said second compartment 4 is fixed to the plate 5.

The second compartment 4 may, for example, advantageously accommodate any other type of electronic device such as a GPS positioning beacon, a contactless access control beacon or remote control (e.g. using RFID technology), or an electronic device for monitoring wearer's physiological parameters.

The second compartment 4 can be made up of a block which is removable but does not necessarily define an internal case accessible to the user of case 1 to vary its contents. In particular if the second compartment 2 contains a second electronic device such as a power supply battery as mentioned above, it is preferable that said battery is hermetically housed in the second compartment 4, the wall 41, the bottom 42 and a possible cover 43 of which are sealed together around the battery.

However, according to an embodiment, the second compartment 4 may delimit a case accessible through a second opening 42 delimited by wall 41 and closed by a cover. The cover 43 can then be swivelled or slid on the wall 41 of the second compartment 4 or on the plate 5. In such an embodiment, the second compartment 4 constitutes an "empty box", comprising a cover 43 that can be opened to allow access to the internal chamber, this chamber being able to be filled with any device or object of the user's choice. For example, it may accommodate an access control tag or a functional module or a module for updating the device contained in the first compartment 2. It may also accommodate a device for the diffusion of home or personal fragrance, essential oils or a sound diffusion device. Finally, it may also accommodate any type of aesthetic ornament, whether jewellery or not, which can for example be visible through the cover 43 which is advantageously equipped with an optically transparent wall (of glass, synthetic material or sapphire for example).

Such an embodiment is shown for example in FIGS. 4A to 5B, in which a case 1 comprising a second compartment 4 removable from the mounting plate 5 is associated with a cover 43 pivotally mounted on the mounting plate 5, the second compartment 4 being slidably mounted on the cover by means of slides 10, 11 arranged on its wall 41 and the edges of the cover 43, respectively.

In this embodiment, the second compartment 4 can host any functionality or device not functionally linked to device 3 contained in the first compartment 2. The second compartment 4 can be used, for example, as a pillbox, or as storage space for an electronic card or memory, a contactless vehicle key or a room access badge.

Where appropriate, cover 43 may incorporate an electromagnetic shielding to prevent access by wireless means of communication to the contents of the chamber in the second compartment 4, thereby ensuring the confidentiality of the information contained therein or, in the case of contactless means of payment, preventing the debiting by an ancillary device when passing close to the holder, as is still possible with current contactless payment cards.

Case 1 of the present invention thus provides a versatile and economical solution for nesting a plurality of different devices and functionalities in a single case adapted to be worn on the wrist in a comfortable and ergonomic manner, without significantly increasing the bulk at the wrist compared to a conventional wristwatch, in particular a connected watch.

The case of the invention further provides the possibility of functionalising a bracelet in several ways according to the needs of the user, without the user having to purchase as many bracelets or devices as there are wanted functionalities.

Of course, although the present invention has been described and represented here for a two-compartment case, it is possible to extend the design of the case of the invention to more than two compartments.

The invention claimed is:

1. A wearable multi-compartment case, comprising:

a body, having a first compartment delimiting a first volume suitable for accommodating a first device, and a mounting plate integral and extending from the first compartment along or parallel to a plane forming an obtuse angle with a median extension plane of the first compartment, said first compartment being delimited by at least one wall peripheral to a first opening in said case; and a second compartment delimiting a second volume and configured to host a functional device, said second compartment being separable from the body and configured to be reversibly secured to the mounting plate of the body, wherein the mounting plate comprises a through opening having a shape complementary to at least a part of the second compartment, said opening of said mounting plate configured and arranged to receive therein the part of the second compartment for reversibly securing the second compartment to the mounting plate.

2. The case according to claim 1, wherein the angle is between 100° and 150° with respect to the extension plane.

3. The case according to claim 1, wherein the second compartment is fixable to an upper face of the mounting plate.

4. The case according to claim 1, wherein said second compartment includes a cover for closing the opening.

5. The case according to claim 4, wherein said cover is pivotally or slidably mounted on a wall of the second compartment or on the mounting plate.

6. The case according to claim 4, wherein the cover comprises or forms an optically transparent window.

7. The case according to claim 1, further comprising:

means for affixing bracelet strands.

8. The case according to claim 1, wherein exterior walls of the first opening and the mounting plate comprise means for affixing bracelet strands.

9. The case according to claim 1, further comprising:

reversible fixing means configured for facilitating removal of the second compartment from the mounting plate.

10. The case according to claim 9, wherein the reversible fixing means are selected from the group consisting of: snap-fastening means, means for embedding by elastic deformation, and screwing means.

11. The case according to claim 1, wherein the first and second compartments comprise complementary electrical contacts arranged such that an electrical contact is established between said compartments.

12. The case according to claim 3, wherein said second compartment delimits an opening closed by a cover.

13. The case according to claim 5, wherein the cover comprises or forms an optically transparent window.

14. The case according to claim 2, wherein exterior walls of the first opening and the mounting plate comprise means for affixing bracelet strands.

15. The case according to claim 1, wherein a top surface of the second compartment, when secured to the mounting plate, presents a top, outward facing face of the case.

16. The case according to claim 1, wherein an exterior wall of the second compartment presents a shape protruding from a shoulder of the exterior wall, configured to be received in the wall of the first compartment for securing the second compartment to the mounting plate.

17. A wearable multi-compartment case, comprising:

a body, having a first compartment delimiting a first volume suitable for accommodating a first device, and a mounting plate integral and extending from the first compartment along or parallel to a plane forming an obtuse angle with a median extension plane of the first compartment, said first compartment being delimited by at least one wall peripheral to a first opening in said case; and a second compartment delimiting a second volume and configured to host a functional device, said second compartment being separable from the body and configured to be reversibly secured to the mounting plate of the body, wherein the mounting plate comprises an opening having a shape complementary to at least a part of the second compartment, said opening and said mounting plate forming a seat in which the part of the second compartment is received for reversibly securing the second compartment to the mounting plate, wherein the second compartment is fixable to a lower face of the mounting plate and is in contact with a wrist of the user when worn by the user.

18. A wearable multi-compartment case, comprising:

a body, having a first compartment delimiting a first volume suitable for accommodating a first device, and a mounting plate integral and extending from the first compartment along or parallel to a plane forming an obtuse angle with a median extension plane of the first compartment, said first compartment being delimited by at least one wall peripheral to a first opening in said case; and a second compartment delimiting a second volume and configured to host a functional device not functionally linked to the first device of the first compartment, said second compartment being separable from the body and configured to be reversibly secured to the mounting plate of the body, wherein the mounting plate comprises an opening having a shape complementary to at least a part of the second compartment, said opening and said mounting plate forming a seat in which the part of the second compartment is received for reversibly securing the second compartment to the mounting plate.

19. A wearable multi-compartment case, comprising:

a body, having a first compartment delimiting a first volume suitable for accommodating a first device, and a mounting plate integral and extending from the first compartment along or parallel to a plane forming an obtuse angle with a median extension plane of the first compartment, said first compartment being delimited by at least one wall peripheral to a first opening in said case; and a second compartment formed as a box separable from the body and enclosing a second volume configured to host a functional device, an exterior of the second compartment including a reversible fixing means that reversibly secures the second compartment to the mounting plate of the body, wherein the mounting plate comprises an opening having a shape complementary to at least a part of the second compartment, a structure of the mounting plate along a perimeter of said opening configured and arranged to receive therein the part of the second compartment for reversibly securing the second compartment to the mounting plate.

20. The case according to claim 19, wherein an exterior wall of the second compartment presents a shape protruding from a shoulder of the exterior wall, configured to be received in the wall of the first compartment for securing the second compartment to the mounting plate.

* * * * *